April 8, 1941.  R. H. COLVIN  2,237,477
HEATING AND VENTILATING APPARATUS
Filed Feb. 28, 1938.  3 Sheets-Sheet 1

Inventor:
Robert H. Colvin
By McCanna, Wintercorn & Morebach
Attys.

April 8, 1941.  R. H. COLVIN  2,237,477

HEATING AND VENTILATING APPARATUS

Filed Feb. 28, 1938  3 Sheets-Sheet 2

Inventor:
Robert H. Colvin
By McCanna, Wintercorn & Morsbach
Attys.

April 8, 1941.                R. H. COLVIN                2,237,477
                   HEATING AND VENTILATING APPARATUS
                    Filed Feb. 28, 1938         3 Sheets-Sheet 3
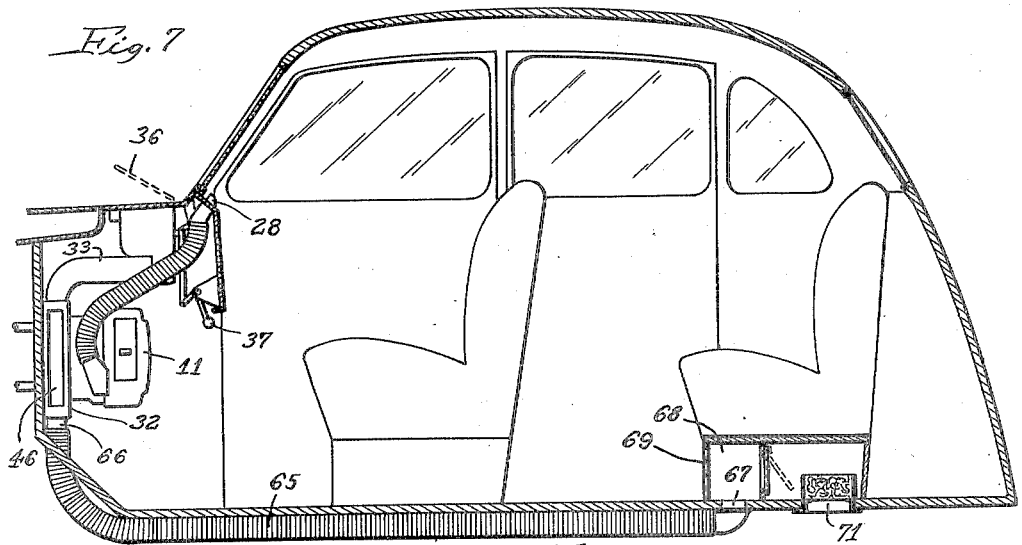
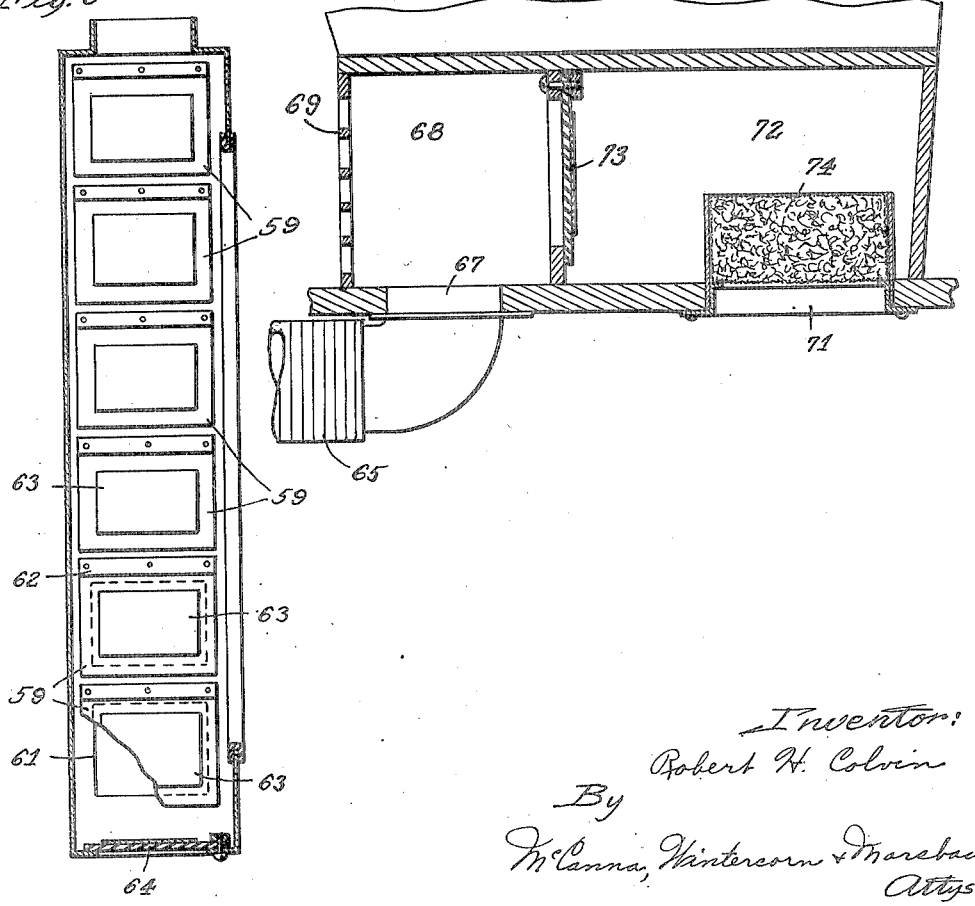
Inventor:
Robert H. Colvin
By
McCanna, Wintercorn & Marzbach
Attys.

Patented Apr. 8, 1941

2,237,477

UNITED STATES PATENT OFFICE 2,237,477

HEATING AND VENTILATING APPARATUS

Robert H. Colvin, Rockford, Ill., assignor to Burd Piston Ring Company, Rockford, Ill., a corporation of Illinois Application February 28, 1938, Serial No. 192,922

3 Claims. (Cl. 98—2)

This invention relates to heating and ventilating apparatus for the occupant's compartment of a motor vehicle. My invention is adapted, however, for heating and ventilating any compartment of a vehicle and in certain of its phases the speed of the vehicle is a factor of the air supply to the heating device.

One of the objects of my invention is to provide an improved method of heating and ventilating the compartment of a motor vehicle, embodying new principles of operation.

Another object of my invention is to improve the heating and ventilating of the occupant's compartment or the like of a motor vehicle particularly with the view to obtaining maximum performance of the heating device under different conditions of operation.

Another object of my invention is to provide for automatic recirculation of air within the compartment of a motor vehicle through a heater which is connected to a source of air supply outside of said compartment such, for example, as a fresh air source.

Another object is to provide for automatic recirculation of air within the compartment of a motor vehicle through a heater in which the recirculation of said air is automatically controlled in connection with the supply of air to the heater from a source outside said compartment.

Another object is to provide heating and ventilating apparatus of the character described in which the automatic recirculation of air from within the compartment is effected by one or more valves or the like dependent upon the volume of air being supplied from the source outside the compartment.

Another object is to provide improved means for heating and ventilating the compartment of a vehicle under different conditions, such, for example, as when the vehicle is at rest and when it is in motion at different speeds, the speed of the vehicle being a factor in inducing a flow of fresh air or the like from outside the compartment and as a further factor in the automatic recirculation of air through the heater from within the compartment.

Another object is to provide for the control of both the fresh air source of supply and the recirculated air under different conditions of operation with the view to obtaining maximum performance of the heater.

Another object is to provide improved heating and ventilating apparatus of the character described in the form of an attachment to a conventional car heater, or any heating device of this general type; and in consequence thereof my invention may be readily applied to present makes of car heaters.

Another object of my invention is to provide heating and ventilating apparatus designed to improve the atmospheric conditions within the compartment of a motor vehicle by reason of controlled admission of fresh air and controlled recirculation of air within the compartment; and I have also aimed to provide apparatus of this character designed to minimize condensation conditions which so frequently cause the formation of heavy frost on the windows and windshield of a motor car.

Another object of my invention is to provide for better circulation and distribution of heat throughout the occupant's compartment of a motor vehicle by means of forced circulation applied in a particularly advantageous manner.

Another object is to provide for exhausting cold air from the floor in the rear seat compartment of a motor vehicle by means of the heater and thereby forcing downward circulation of heated air from the higher levels and heating the lower levels which normally contain cold inactive air.

Another object is to provide for exhausting cold air from the floor region in the rear compartment by means of a breather outlet, under certain operating conditions hereinafter described, the breather being sound deadening and proof against the entrance of dirt and foreign material.

Other objects and attendant advantages will be appreciated by those skilled in this art as the invention becomes better understood by reference to the following description, when considered in connection with the accompanying drawings, in which—

Fig. 4 is an enlarged fragmentary section of one of the recirculating valves taken substantially on the section line 4—4 of Figure 1;

Fig. 5 is a similar section taken on the section line 5—5 of Fig. 3, showing a modified form of valve support;

Fig. 6 is a vertical section through the air intake manifold removed from the heater, showing a modified form of valve;

Fig. 7 is a diagrammatic section through a motor car showing the application of my invention thereto; and Fig. 8 is an enlarged section showing the breather and the air intake beneath the rear seat.

Figure 1:
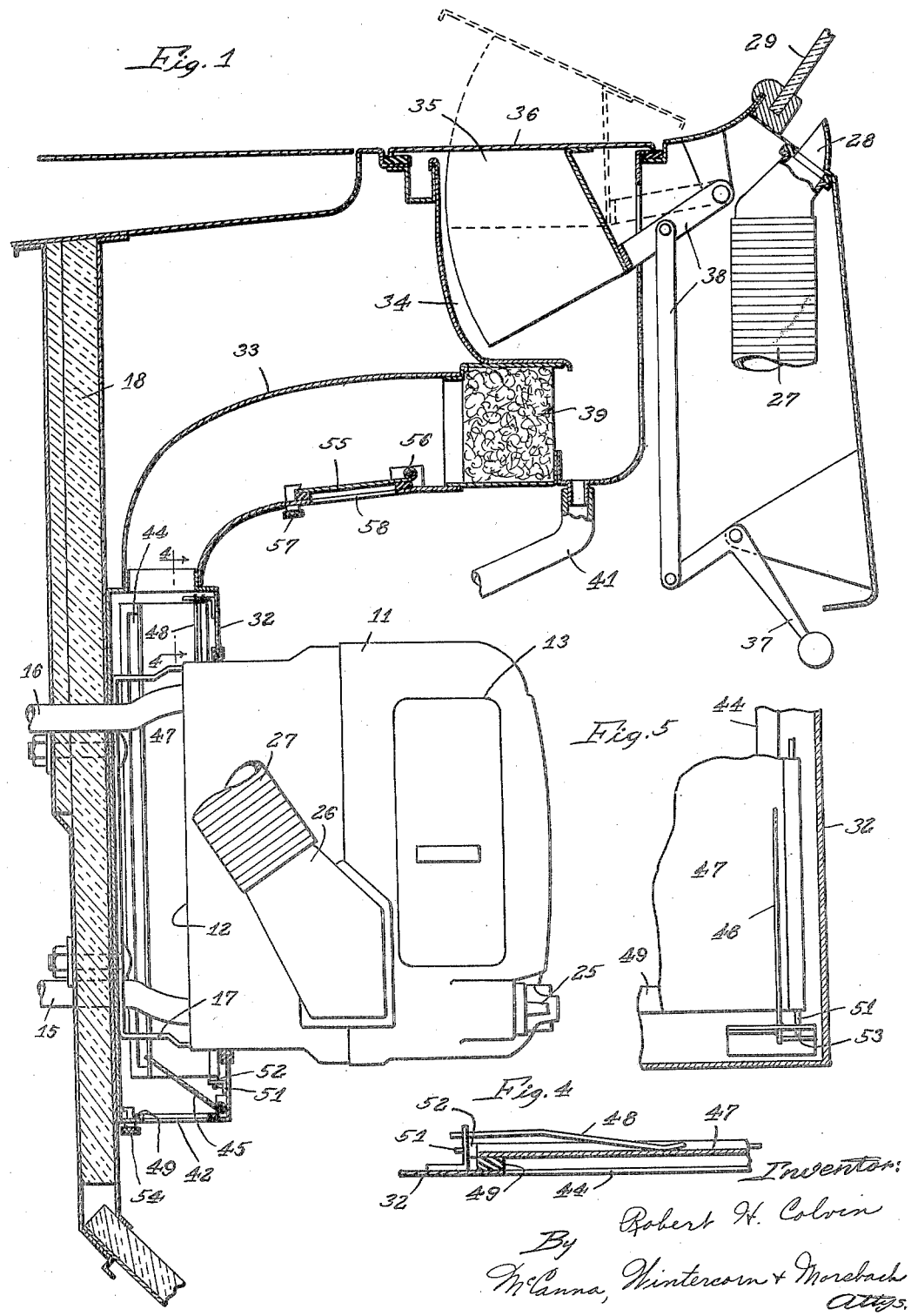
Figure 1 is a vertical fragmentary section through the forward end of the occupant's compartment of a motor vehicle, showing the application of a heating and ventilating apparatus embodying my invention.

In this application I have shown my invention as applied to the occupant's compartment of a motor vehicle and to a heating system of the type employing the cooling fluid of the engine cooling system. This system as most commonly used includes a heat transfer device installed in the compartment usually at the dash board; and the heat transfer device usually includes a radiator through which hot water from the engine cooling system is circulated, air being moved through the radiator either by a small electric fan located in juxtaposition to the radiator, or by the engine fan, or by other means. The present invention is particularly applicable to heating systems of this type but is not limited to such applications. For example, my invention may be applied to heating means which do not utilize heat from the engine. It may also be applied to heating devices which are built into the vehicle by the car manufacturer as distinguished from the usual car heater which is installed as accessory equipment. My invention is applicable to propelled vehicles such as automobiles, trucks, busses, airplanes, and the like, having a compartment to be heated and ventilated.

Considering the application of my invention to an automobile equipped with a heater of the type utilizing the cooling fluid for heat transfer and having a motor driven fan for forcing air through the heater, my invention contemplates the provision of a controlled source of supply of air from outside the compartment together with a source from inside the compartment and the passage of air from these sources through the heater in such manner and in such proportions as to promote greater efficiencies in heating and ventilating under different conditions of use. In the illustration mentioned my invention provides an intake duct or chamber at the intake side of the heater communicating with the outside atmosphere so that fresh air may be drawn into the heater either by the motor fan or by pressure induced by forward speed of the car, or by both. I have also provided means operating automatically to supply air to said intake duct or chamber from within the compartment. Thus, when there is not sufficient air coming into the heater from the outside to supply as much as the fan will take away or as much as may be desired by the operator, air from inside of the car will be recirculated through the heater. By the provision of suitable controls these air supplies may be regulated to suit the particular conditions, and these controls may be set for automatic operation, as desired. In this manner, conditions of heat, ventilation, and humidity may be controlled to the betterment of atmospheric conditions within the car.

Referring to the drawings—I have shown for purpose of illustration a hot water heater of a design disclosed in the application of Daniel R. Grossman, Serial No. 148,676, filed June 17, 1937. This heater has a casing 11 having an air intake end or opening 12 and an outlet end having outlets 13 for the discharge of heated air into the occupant's compartment. In this form of heater the radiator or heat transfer device 14 is arranged across the inlet opening 12 and supplied with hot water through the pipes 15 and 16 connected with the cooling system of the engine. Brackets 17 support the heater casing on the dash board 18. A small electric motor 19 mounted in the heater casing drives an impeller fan 21 which draws air through the inlet opening 12 and forces it out of the openings 13 for circulation within the occupant's compartment. The motor also drives a centrifugal type impeller 22 which has an inlet 23 through which heated air is taken from within the heater casing and from which it is delivered through a valve controlled passage 24 for delivery to a nozzle located at the windshield or to an outlet at some remote location in the compartment. In these drawings the exterior only of the valve controlled passage is shown at 24 together with a valve 25 operable to open and close passages leading to the windshield or to a remote point such as mentioned. One of these passages is through a conduit 26, flexible tubing 27 and nozzles 28 to the windshield 29. It will be understood that this particular design of heater is shown merely for illustrating one having a variety of functions, and that in the broader aspects of my invention any suitable heater or heating device may be employed, whether or not a motor driven fan is used, or whether or not the heating device is installed within the occupant's compartment. It is essential, however, that the heating device shall have a source of air supply outside the compartment and that the heated air shall be delivered for circulation into the compartment.

In the case shown, I apply an air intake manifold designated generally by 32 to the intake end of the heater and connect this manifold with the outside atmosphere. The manifold may be in the form of an attachment to a hot water heater of conventional construction or it may be incorporated in the heater as an air inlet duct or chamber in the inlet end thereof. In the present case the manifold is a box-like enclosure around the inlet end of the heater. A conduit 33 of substantially the width of the manifold connects the top thereof with a weather separation chamber 34 which in turn communicates with the outside atmosphere through an opening 35 in the cowl. The latter opening is normally closed by a door 36 which may be moved to any degree of opening and held in any such position by suitable control means. In the present case a manual control is provided consisting of a hand lever 37 connected by links 38 to the door 36. My invention contemplates, however, the provision of thermostatically controlled means (not shown) for opening and closing the door 36, or the equivalent, and for regulating the degree of such opening; in other words the provision of temperature responsive means located within the occupant's compartment for controlling the admission of fresh air to the heater. The chamber 34 is provided with a suitable air filter 39 intercepting the passage of air to the heater, and also with a drain 41. This weather separation chamber is designed to serve as a trap for rain, snow and foreign materials and as a filter for the air being delivered to the heater from the outside source. It should be manifest that in the application of my invention this connection with the outside air may be constructed and arranged to suit the particular conditions, not inconsistent with the purposes of my invention.

The manifold 32 is equipped with means for admitting a controlled volume of air into the heater from the interior of the occupant's compartment and, in effect, to obtain automatic recirculation of air through the heater under different conditions which will be presently noted. In the present case this means comprises a series of air inlet openings adapted to be closed and opened by automatically controlled valves for governing the flow of recirculating air to the heater. In this case an opening 42 is provided in the bottom wall and openings 43 and 44 in the side walls, respectively, of the manifold. These openings are of relatively large area, as shown. The valve means in the present form of my invention are preferably valves in the nature of flaps or hinged doors sensitive in their response to changes in pressure. In my experiments I have used various forms of valves including rubber flaps and sheet metal doors having a sensitive hinge support and normally urged to a closed position either under its own weight or by the use of a suitable spring. Doors of this type, namely, 45, 46 and 47 for the openings 42, 43 and 44, respectively, are shown in Figs. 1 and 3 to 7, inclusive. Each door is hingedly supported along its rear longitudinal edge to swing to an open position against the resistance of its weight as in the case of the door 45 or against the resistance of a spring 48 in the case of either of the doors 46 and 47. When in the closed position each door seats against a soft rubber gasket 49 flanking each inlet opening. Any suitable form of sensitive hinge may be provided as, for example, one having a wire like pintle 51 and small thrust rings 52 of low friction material on which the weight of the door is carried. Another form of suitable valve support is shown in Fig. 5 in which the pintle 51 has a spherical lower end resting on a supporting bracket 53. Suitable means is provided for locking each of the doors in a closed position as, for example, by means of a latch 54 adapted to be turned by the operator for locking or releasing the door, as the case may be. Another door 55 of this type is applied to the fresh air conduit 33, this door being hinged at 56 and here shown held in a closed position by means of a latch 57, closing the opening 58. In Fig. 6 I have shown another form of air inlet valve in the manifold consisting of a series of rubber flaps 59 normally closing a corresponding series of openings 61 in the side walls of the manifold, these flaps taking the place of the doors 46 and 47 above described. Each rubber flap, fixed at its upper edge 62 to the inner side wall of the manifold, has a thin aluminum plate 63 fixed to its inner side. Similar flaps 64 are applied to the lower wall in place of the door 45. Any number of flaps may be used but I prefer to divide the air inlet area for recirculation into a series of openings with individual flaps which I find gives more sensitive control of the air recirculation, less air resistance, and an effective air seal when the flaps are closed.

Figure 2:
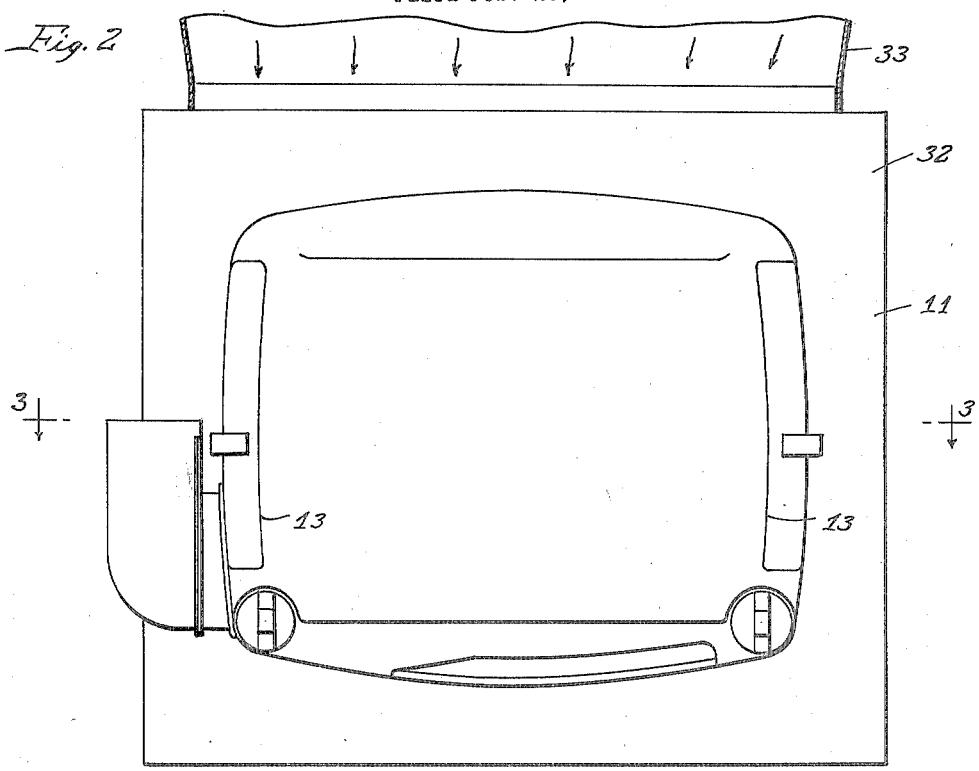
Fig. 2 is a front elevation of the heater shown in Figure 1 with part of the intake air duct in section.
Figure 3:
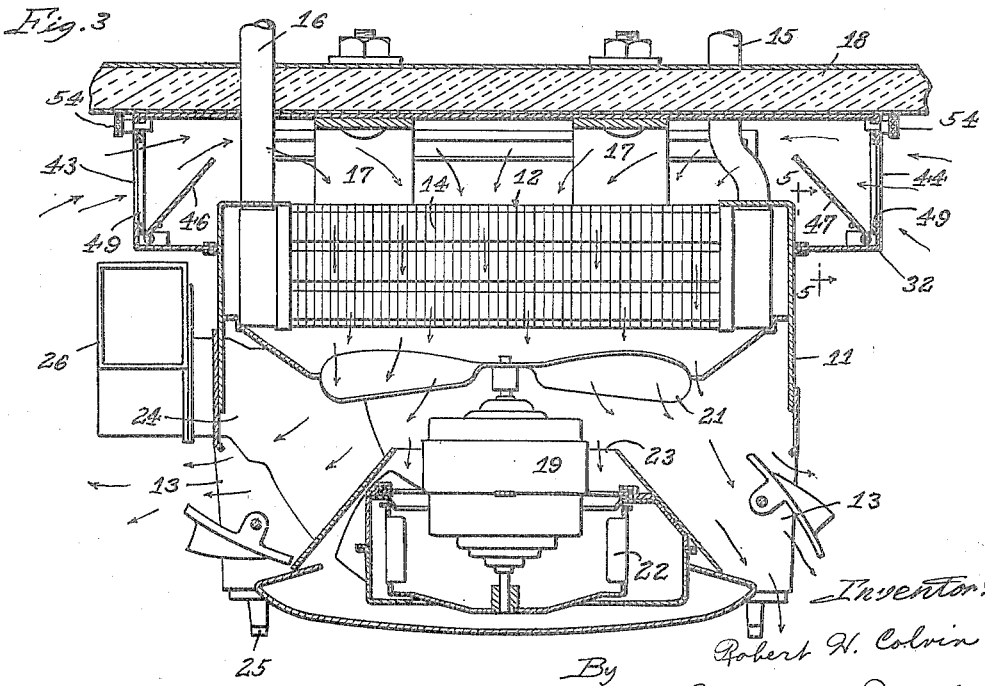
Fig. 3 is a horizontal section taken substantially on the section line 3—3 of Fig. 2 with some of the parts in elevation.

In describing the operation I will consider first the condition wherein the outside air source is closed, as shown in Fig. 1, confining the description to Figs. 1, 2 and 3. When the motor 19 is turned on, the fan 21 produces a vacuous condition in the manifold 32 which is sufficient to cause the outside air pressure, that is, the air pressure within the compartment, to open the normally closed doors 45, 46 and 47 and allow air from the compartment to enter the manifold chamber. This air will be drawn through the heater 12 and discharged into the car body, thereby providing circulation of heated air within the occupant's compartment. Under this condition the air from within the compartment is recirculated through the heater and the heater functions as an ordinary hot water heater, except for the fact that since the opening of the doors therein requires a slight amount of force, the amount of air passing through the heater is not as great as it would be if there was no obstruction to the intake of air. However, in actual practice, this loss is very small and after the doors are opened by the passage of air through them, this flow of air tends to hold them open until the fan motor is turned off.

I will now consider the condition where the outside air source is opened as by means of the lever 37 and the fan motor on the heater is turned off, as applied to Figs. 1, 2 and 3. Under this condition the doors 45, 46 and 47 are normally closed and the only air that will pass through the heater is that which is taken in through the opening 35, due to the forward motion of the car. In this condition, the openings in the manifold 32 which are normally closed by the doors as above mentioned, will be closed with the additional force of the air entering from the outside source, thus insuring a better seating of the doors against the rubber surfaces with which they make contact and close the respective openings. In this condition the door 55 may either be locked closed or it may be left to function the same as the doors in the manifold proper, it being evident that this additional door 55 allows for greater volume of recirculation which is desirable under certain conditions. With this arrangement fresh air will be induced through the heater in proportion to forward speed of the car and the extent of opening of the outside door 36. During average cold weather conditions the outside door 36 may be left wide open and the flow of air through the heater and into the occupant's compartment will convey sufficient heat to give a feeling of comfort with lower actual temperature than when the heater air is taken entirely from the interior of the car body. It is found, however, with this installation, when the outside air source is left wide open and the outside temperature is higher, for example above 32° F., that it is necessary to restrict the outside opening by means of the door 36 in order to not get too much heat into the car, which would be uncomfortable to the passengers. In such cases the outside air source can be restricted to allow only enough air to come through the heater to give the proper amount of warmth for the comfort of the passengers. In conditions below freezing, but not at excessively low temperatures, I have found that an ample supply of heat may be obtained when driving at normal speeds and particularly at the higher speeds as when traveling on highways, although it will be manifest that wind conditions must be taken into consideration because of the differences in driving into a head wind or driving with the wind. At the higher speeds particularly there is ample flow of fresh air through the heater and this air is heated sufficiently to provide the desired warmth in the car.

I will consider now the condition where the outside air source is open and the fan motor in the heater is running, as applied to Figs. 1, 2 and 3. Normally under this condition the air within the compartment is being recirculated through the heater, as above described. When the car is standing still there will be a small amount of air drawn in from the outside opening 35 due to the drop in pressure within the manifold and intake duct because of the action of the fan, although the volume of this air coming from the outside will be relatively small compared with the air being recirculated through the doors in the manifold. As the car is put in forward motion the amount of air coming in through the fresh air duct will increase and the doors in the manifold will begin to close as the forward motion of the car is increased, up to, as on this particular installation, at about 50 miles per hour all of the doors are closed and the only air passing through the heater is that coming from the outside air source. It has been found in actual practice that where the forward speed of the car is increased there is less benefit to be derived from running the motor on the heater because all of the air that could be supplied from the outside air source is being forced into the heater and the fan is producing no particular effect except to give slightly added velocity to the air. It will be noted that the recirculation of air through the heater depends upon the air pressure conditions produced within the manifold by the action of the fan and by the volume of air being supplied from the outside source. When the fan is starved by insufficient air supply from the outside source the pressure within the manifold is lowered and the flaps will automatically open and allow air to be drawn into the manifold from the interior of the compartment and recirculated through the heater. The proportioning of the air being recirculated within the car and that coming from the outside source will gradually change as the forward motion of the car is increased. This ratio will depend entirely upon the particular installation and will to some extent be dependent upon the natural movement of the air outside of the car body as when heading into or away from a wind. However, in any case, when the motor fan is running and the doors in the manifold and the air inlet duct are released and free to function, there will be automatic recirculation of air to such an extent as to insure having the maximum amount of air passing through the heater for the purpose of heating the car interior. This proportioning of the recirculating air may also be varied by control of the speed of the fan motor, which usually has a resistance type switch under control of the operator.

It will be seen from the foregoing that with the use of my improvements a car heater may be caused to function as in a normal installation where there is no connection with an outside air source, or as if it were connected only to an outside air source, or as a combination of the two wherein there is automatic recirculation of controlled proportions of air from an outside source and from within the compartment. This provides for maximum performance of the heater and promotes greater efficiencies in heating and ventilating the compartment of a motor vehicle.

In Fig. 7 I have shown an additional phase of my invention which contemplates exhausting cold air from the area between the front and rear seats and causing forced circulation of heated air from the upper levels downwardly into the said area behind the front seat, thereby effectively heating the rear seat and foot compartment without the use of a supplemental heater. My invention also contemplates the provision of one or more air intake conduits for the heater communicating with the interior of the occupant's compartment at points remote from the heater for producing better heat distribution and more comfortable heat in a motor vehicle.

In an automobile body having a rear passenger compartment as shown in Fig. 7 there is a lack of proper circulation of heated air in the rear passenger compartment due to the fact that warm air has a tendency to rise and, therefore, the area below the top of the front seat and in front of the back seat is not supplied with the proper amount of heated air. My invention provides for heating and ventilating this compartment without the use of an auxiliary or supplemental heater. In the example shown the single conduit 65 connected at 66 to the bottom of the heater manifold 32 is arranged to have its inlet end 67 located at a remote point within the compartment, preferably at or adjacent to the floor, so as to exhaust the air from this area and recirculate the exhausted air back through the heater. This creates positive circulation in this lower area and insures the delivery of heated air thereto from the upper levels in the compartment. As here shown the inlet 67 opens into a chamber 68 beneath the rear seat substantially coextensive with its length and having a suitable grille 69 or the like across the front. This structure is designed to positively draw air into the heater from the floor region between the front and back seats and thereby insure circulation of heated air through this region and to the rear portion of the compartment. This function takes place particularly when the outside air source is closed and at all times when the heater is functioning to recirculate the air within the car. Under these conditions, it will be manifest that the cold air from the floor area of the rear seat compartment is withdrawn by means of the inlet 67, thus causing the heated air from the upper levels to be drawn down into the lower levels between the front and back seats and circulated therein.

As above stated my invention contemplates the provision of a remote air inlet of this type leading to different points within the compartment and suitably connected to the inlet side of the heater so as to be assured of the desired suction effect. Under this phase of my invention the air intake area to the heater from the interior of the compartment may be proportioned to take a greater or lesser amount of air from the immediate vicinity of the heater, or the entire air intake may be from remote points through suitable conduits, in which latter case the recirculating valves, flaps or doors would be suitably located according to the construction of the particular installation. In the case of a heater intake manifold such as here disclosed the additional air intake conduits may be connected to the side openings similar to the connection of the conduit 65 to the manifold.

In order to improve the circulation of heated air particularly under the condition when the outside air source is open and the fan motor is shut off and the car is in forward motion, I have provided a breather outlet 71 through the floor of the occupant's compartment communicating therewith through a chamber 72 and a suitable valve 73 such as one similar to a flap 59. The breather includes a filter 74 of suitable fibrous material which serves to prevent the passage of dust, dirt and road noises into the compartment. Under this operating condition there is a slightly greater static pressure built up within the car relative to the outside air pressure. This causes the normally closed flap 73 to be opened to admit air from the interior of the car body to the compartment 72. This air in turn passes through the filter and noise deadening material 74 and to the outside atmosphere at passage 71. This provides for taking the cold air off from the floor in the rear compartment and thus insures the warm air being forced down from the upper portion of the car body.

When the outside air source is open and the car is in forward motion the door 45 in the manifold at the back of the heater connecting with conduit 65 will be closed first because it is normally closed by its own weight which is greater than the spring tension provided for the side doors in the heater manifold, and secondly, because of the air pressure within the manifold tending to hold the doors closed. Now, due to the action of the fan and the static pressure built up within the car body, forward motion of the car will produce an opening of the flap 73 as described above when the outside air source was open and the heater motor not running. From the above it will be apparent that I am able to produce under all conditions of operation the exhausting of the cold air from the lower area in the rear compartment in order to produce a good distribution of heat within such compartment.

The forced circulation throughout the interior of the car body is desirable because it promotes more uniform distribution of heat. It should be manifest, however, that my invention in its broader aspect is not restricted to the use of remote air inlets to the heater from the interior of the compartment but it is adapted for general application according to the teachings above described in reference to Figs. 1 to 6 inclusive.

With the use of my invention there is less need for so-called defrosters because the condensation conditions are less severe due to the supply of fresh air from the outside source. However, delivery of a blast of heated air to the windshield as through the nozzle 28 serves effectively for desleeting when the outside weather conditions are severe.

It should be manifest from the foregoing that my invention provides for improved heating and ventilating of a vehicle compartment, particularly in view of the ready adaptation to the widely different conditions under which a motor vehicle is used. It should also be manifest that because of these different adaptations I am able to obtain a higher degree of performance from the heater. These advantages are due particularly to the control of the outside air and recirculated air supplied to the heater. As above explained, the particular installation shown in the drawings and herein described is merely for the purpose of general illustration and it is further intended that the invention may be applied with any car heater or heating device or any installation in a vehicle whether it embodies a built-in heater such as might be embodied in the manufacture of the vehicle or whether it is in the nature of accessory equipment. It follows, therefore, that in practice my invention may be embodied in other forms of construction within the spirit and scope of the appended claims, in which I claim:

1. In combination, a heater unit comprising a casing having an air inlet end and an air outlet end, a heat transfer device within the casing, and means for forcing air through the casing from the inlet end to the outlet end; an air supply unit adapted for attachment to the heater unit comprising a casing having an air inlet end and an air outlet end and shaped at its air outlet end for attachment to the air inlet end of said heater unit casing so that air flow through the air supply unit will deliver into the heater unit, and one or more air inlets in the casing of the attachment unit each normally closed by a valve mounted on such unit, each valve normally closing its said opening and mounted for sensitive inward opening movement in response to lower pressure of the air within the attachment unit; a fresh air conduit connecting the air inlet end of the attachment unit with the outside atmosphere; and means for controlling the volume of air flow through said fresh air conduit.

2. Heating and ventilating apparatus for the compartment of a motor vehicle including, in combination, a heater unit comprising a casing having an air inlet end and an air outlet end, a heat transfer device within the casing, and means for forcing air through the casing from the inlet end to the outlet end for discharging through the latter into the vehicle compartment; an air supply unit adapted for attachment to the heater unit comprising a casing having an air inlet end and an air outlet end and shaped at its air outlet end for attachment to the air inlet end of said heater unit casing so that air flow through the air supply unit will deliver into the heater unit, and one or more air inlets in the casing of the attachment unit each normally closed by a valve mounted on such unit, each valve normally closing its said opening and mounted for sensitive inward opening movement in response to lower pressure of the air within the attachment unit casing; and a fresh air conduit having an inlet end communicating with the outside atmosphere and connected for delivering fresh air into the air inlet end of the attachment unit, together with means for controlling the volume of air flow through said fresh air conduit and also for causing fresh air to be delivered into said conduit of a volume dependent upon the forward speed of the vehicle.

3. Heating and ventilating apparatus for the compartment of a motor vehicle including, in combination, a heater having a casing and heat transfer means therein, the casing having an air inlet end and an air outlet end, controllable motor driven means for forcing air through the heater casing from the inlet to the outlet end and discharging the heated air into the vehicle compartment, a fresh air conduit connecting the inlet end of the heater casing with the outside atmosphere together with means for causing flow of air from the outside to the heater induced by forward speed of the vehicle independently of operation of said motor driven means, valve means in the air inlet to the heater casing comprising one or more sensitive air valves normally closed and adapted to automatically open in response to predetermined drop in air pressure within the heater casing below that in the compartment and to automatically close in response to reversal of said pressure relation, and controllable means for opening and closing said fresh air conduit, whereby under one condition of operation with said conduit closed and said motor driven means in operation air will be automatically recirculated between the compartment and the heater through said valve means, and under another condition of operation with said conduit open and said motor driven means inoperative fresh air will flow through the conduit and the heater as induced by forward speed of the vehicle and said valve means will prevent recirculation through the heater, and under a further condition of operation with said conduit open and said motor driven means in operation automatic recirculation of air between the compartment and the heater will occur depending on the air pressure conditions within the heater casing as a consequence of the condition of rest or speed of travel of the vehicle.

ROBERT H. COLVIN.